US011979261B2

United States Patent
Takagi et al.

(10) Patent No.: US 11,979,261 B2
(45) Date of Patent: May 7, 2024

(54) TRANSMITTING APPARATUS, TRANSMISSION METHOD, AND STORAGE MEDIUM

(71) Applicant: Mitsubishi Electric Corporation, Tokyo (JP)

(72) Inventors: Manabu Takagi, Tokyo (JP); Yasunori Noda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 109 days.

(21) Appl. No.: 17/712,771

(22) Filed: Apr. 4, 2022

(65) Prior Publication Data

US 2022/0231888 A1 Jul. 21, 2022

Related U.S. Application Data

(63) Continuation of application No. PCT/JP2019/047496, filed on Dec. 4, 2019.

(51) Int. Cl.
*H04L 25/02* (2006.01)
*H04B 1/00* (2006.01)

(52) U.S. Cl.
CPC ....... *H04L 25/0254* (2013.01); *H04B 1/0057* (2013.01)

(58) Field of Classification Search
CPC ... H04L 25/0254; H04L 27/26; H04B 1/0057; Y02D 30/70; H04J 1/00
See application file for complete search history.

(56) References Cited

U.S. PATENT DOCUMENTS

| 9,197,282 B2 | 11/2015 | Cahn et al. | |
| 2011/0299630 A1* | 12/2011 | Petrovic | H04B 7/0408 |
| | | | 375/340 |
| 2020/0059306 A1* | 2/2020 | Baek | H04B 7/0473 |

FOREIGN PATENT DOCUMENTS

| JP | 2004172829 A * | 6/2004 | ......... H04L 27/3433 |
| JP | 5136489 B2 | 2/2013 | |

OTHER PUBLICATIONS

Extended European Search Report for European Application No. 19955356.1 dated Nov. 9, 2022.
Doufana et al., "Neural Network based Power Amplifier Dynamic Modeling for Wireless Communications", ICMMT 2008 Proceedings, Apr. 21, 2008, total 5 pages.
Hein et al., "Status of Galileo Frequency and Signal Design", Galileo, Sep. 2002, total 13 pages.
International Search Report for PCT/JP2019/047496 dated Jan. 7, 2020.
Notification of Reasons for Refusal issued in the corresponding Japan Application No. 2020-514301, dated Jun. 9, 2020.
Written Opinion of the International Searching Authority for PCT/JP2019/047496 dated Jan. 7, 2020.

* cited by examiner

Primary Examiner — Jean B Corrielus
(74) Attorney, Agent, or Firm — Birch, Stewart, Kolasch & Birch, LLP

(57) ABSTRACT

A transmitting apparatus includes an analog transmitting unit that performs analog processing on a multiplex signal in which two or more signals are multiplexed and generates a transmission signal, and a signal multiplexing and learning unit that multiplexes the two or more signals with a neural network whose parameters have been adjusted based on the analog characteristics of the analog transmitting unit and constraints on the multiplex signal and generates the multiplex signal.

9 Claims, 11 Drawing Sheets

FIG.5

| SIGNAL NAME | SYMBOL RATE | CENTER FREQUENCY | CONSTRAINTS | |
|---|---|---|---|---|
| | | | TRANSMISSION POWER RATIO | PHASE |
| SIGNAL A | 1.023 MHz | f1 | -1.5 dBm | 0 |
| SIGNAL B | 2.046 MHz | f2 | -3.5 dBm | $\pi/2$ |
| SIGNAL C | 6.138 MHz | f2 | 0.0 dBm | $\pi/2$ |
| SIGNAL D | 12.276 MHz | f1 | -2.0 dBm | $\pi/2$ |

FIG.6

| SIGNAL A | SIGNAL B | SIGNAL C | SIGNAL D |
|---|---|---|---|
| 0 | 0 | 0 | 0 |
| 0 | 0 | 0 | 1 |
| 0 | 0 | 1 | 0 |
| 0 | 0 | 1 | 1 |
| 0 | 1 | 0 | 0 |
| 0 | 1 | 0 | 1 |
| 0 | 1 | 1 | 0 |
| 0 | 1 | 1 | 1 |
| 1 | 0 | 0 | 0 |
| 1 | 0 | 0 | 1 |
| 1 | 0 | 1 | 0 |
| 1 | 0 | 1 | 1 |
| 1 | 1 | 0 | 0 |
| 1 | 1 | 0 | 1 |
| 1 | 1 | 1 | 0 |
| 1 | 1 | 1 | 1 |

FIG.11

```
START
  ↓
ACQUIRE SPREAD DATA  — S1
  ↓
ADJUST SYMBOL RATES  — S2
  ↓
GENERATE MULTIPLEX SIGNAL  — S8
  ↓
TRANSMIT MULTIPLEX SIGNAL  — S9
  ↓
END
```

FIG.12

| INPUT #1 | INPUT #2 | INPUT #3 | INPUT #4 | OUTPUT #1 | OUTPUT #2 |
|---|---|---|---|---|---|
| 0 | 0 | 0 | 0 | 0.31 | 0.99 |
| 0 | 0 | 0 | 1 | 0.69 | 0.74 |
| 0 | 0 | 1 | 0 | -0.26 | 0.98 |
| 0 | 0 | 1 | 1 | -0.62 | 0.78 |
| 0 | 1 | 0 | 0 | 0.46 | 0.91 |
| 0 | 1 | 0 | 1 | 0.90 | -0.50 |
| 0 | 1 | 1 | 0 | -0.41 | 0.92 |
| 0 | 1 | 1 | 1 | -0.88 | -0.52 |
| 1 | 0 | 0 | 0 | 0.90 | 0.46 |
| 1 | 0 | 0 | 1 | 0.45 | -0.97 |
| 1 | 0 | 1 | 0 | -0.93 | 0.38 |
| 1 | 0 | 1 | 1 | -0.39 | -0.99 |
| 1 | 1 | 0 | 0 | 0.60 | -0.87 |
| 1 | 1 | 0 | 0 | 0.29 | -0.10 |
| 1 | 1 | 1 | 0 | -0.61 | -0.84 |
| 1 | 1 | 1 | 1 | -0.26 | -0.10 |

1
TRANSMITTING APPARATUS, TRANSMISSION METHOD, AND STORAGE MEDIUM

CROSS-REFERENCE TO RELATED APPLICATION

This application is a continuation application of International Application PCT/JP2019/047496, filed on Dec. 4, 2019, and designating the U.S., the entire contents of which are incorporated herein by reference.

BACKGROUND OF THE INVENTION

1. Field of the Invention

The present disclosure relates to a transmitting apparatus for multiplexing and transmitting signals, a transmission method, and a storage medium.

2. Description of the Related Art

There have been communication systems in which a transmitting apparatus multiplexes and transmits signals that have undergone spread processing with spreading sequences, and a receiving apparatus despreads received signals to obtain the original signals. This technique is used in, for example, transmitting apparatuses mounted on satellites that transmit a positioning signal etc.

For satellite communication systems, the downsizing of satellites and the reduction of power consumption are important problems. To solve these problems, it is effective to improve the power-added efficiency of an amplifier in a transmitting apparatus. For example, when the power-added efficiency of the amplifier is considered in terms of a transmission signal, it is necessary to keep the peak-to-average power ratio (PAPR) of the transmission signal small. The larger the output power of the amplifier used in the transmitting apparatus, the better the power-added efficiency. Thus, it is desirable to bring the operating point as close to the maximum value of the output power as possible. However, if the output power exceeds a certain threshold value, nonlinear distortion unacceptable for the transmission signal occurs. That is, there is a trade-off between distortion and power-added efficiency. The smaller the PAPR of the transmission signal, the smaller the backoff can be made, which is the difference between the operating point and the threshold value, and the more the power-added efficiency can be improved.

When two or more signals are simply multiplexed, especially when signal power allocated between the signals is different, there arises a problem that the signals have different amplitudes, and a multiplexed signal does not become a constant envelope. As a result, the signal waveform is distorted on the time axis, increasing the PAPR, so that it is necessary to increase the backoff, reducing the power-added efficiency. Thus, it is required to make a multiplexed signal become a constant envelope.

U.S. Pat. No. 9,197,282 describes a multiplexing method called a Phase-Optimized Constant-Envelope Transmission (POCET) method. The POCET method is a technique to obtain phase information corresponding to a combination of 0 and 1 of original signals to be multiplexed by solving an optimization problem in which it is an objective function to minimize the envelope of a multiplexed signal, subject to constraints such as signal power to be multiplexed and the phase relationships between the signals, and generate a multiplex signal based on the phase information for transmission with a constant envelope while minimizing distortion at a receiving apparatus.

According to the above conventional technique, the multiplexed signal is constant envelope modulated, so that a satellite power amplifier can continue to operate in the nonlinear saturation region, and the effect of improving the power-added efficiency can be obtained. However, it can be considered that if the characteristics of an analog circuit such as an amplifier change due to long-term satellite operation, a multiplexed signal will not be constant envelope modulated, so that the satellite power amplifier cannot continue to operate in the nonlinear saturation region, resulting in a reduction in the power-added efficiency. As a measure against this, it can be considered to monitor the analog circuit to generate a multiplex signal that takes the analog characteristics into consideration. However, for that, it is necessary to consider two points, a point that it is necessary to formulate the analog characteristics, and a point that whether the formula can be mathematically optimized is determined, which has a problem such as an increase in design difficulty.

The present disclosure has been made in view of the above. It is an object of the present disclosure to provide a transmitting apparatus capable of generating a multiplex signal that takes analog characteristics into consideration while avoiding an increase in design difficulty.

SUMMARY OF THE INVENTION

In order to solve the above-mentioned problem and achieve the object, a transmitting apparatus according to the present disclosure includes: an analog transmitting unit to perform analog processing on a multiplex signal in which two or more signals are multiplexed to generate a transmission signal; and a signal multiplexing and learning unit to multiplex the two or more signals with a neural network whose parameters have been adjusted based on analog characteristics of the analog transmitting unit and constraints on the multiplex signal to generate the multiplex signal.

BRIEF DESCRIPTION OF THE DRAWINGS

FIG. 5 is a diagram illustrating an example of two or more signals input to the transmitting apparatus according to the first embodiment;

FIG. 6 is a diagram illustrating possible patterns of the signals to be multiplexed by the transmitting apparatus according to the first embodiment;

FIG. 11 is a flowchart illustrating an example of the operation of the transmitting apparatus to transmit a multiplex signal according to the first embodiment;

FIG. 12 is a diagram illustrating an example of input and output results of the signal multiplexing and learning unit that is a component of the transmitting apparatus according to the first embodiment;

DETAILED DESCRIPTION OF THE PREFERRED EMBODIMENTS

Hereinafter, a transmitting apparatus, a transmission method, and a storage medium according to embodiments of the present disclosure will be described in detail with reference to the drawings.

First Embodiment

Figure 1:
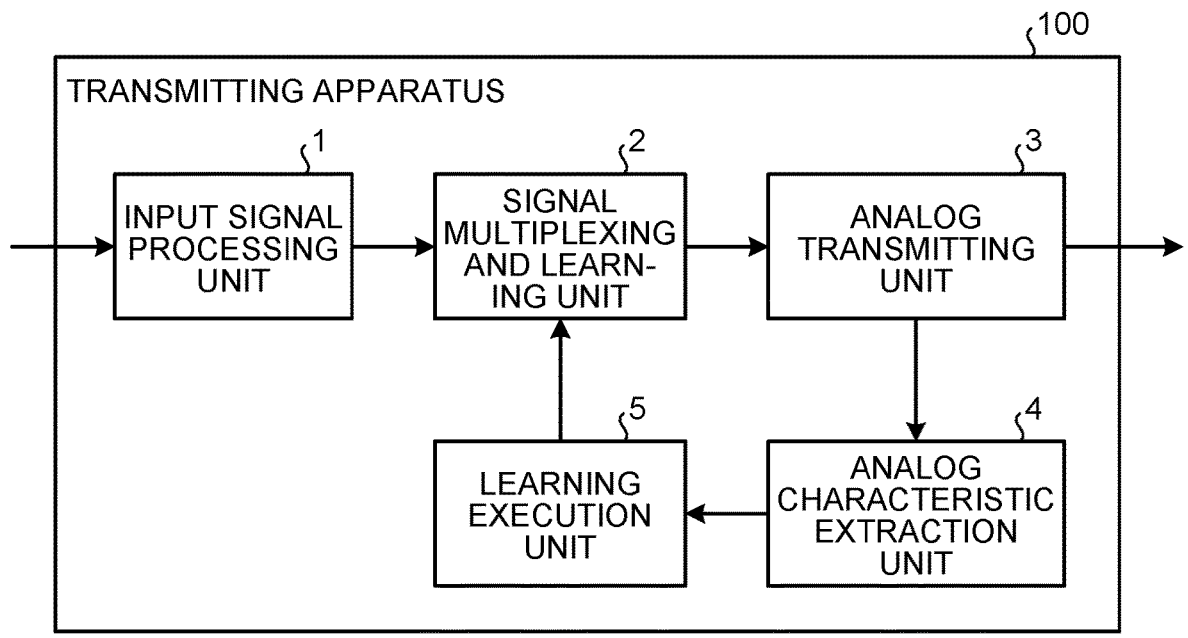
FIG. 1 is a diagram illustrating a functional configuration example of a transmitting apparatus according to a first embodiment.

FIG. 1 is a diagram illustrating a functional configuration example of a transmitting apparatus according to a first embodiment. A transmitting apparatus 100 according to the present embodiment receives two or more pieces of spread data obtained by spreading data acquired from the outside as input, and obtains a multiplex signal from the analog characteristics of the apparatus and set constraints. Here, the two or more pieces of spread data to be input signals are each generated by, for example, spreading message data or data with a fixed repeated pattern. The analog characteristics of the apparatus mean the characteristics of an analog circuit such as a transmitting circuit. In the present embodiment, a signal transmitted by the transmitting apparatus 100 is "0" or "1", but a numerical value other than these may be transmitted. The transmitting apparatus 100 is mounted on, for example, a satellite that is a component of a satellite communication system.

As illustrated in FIG. 1, the transmitting apparatus 100 includes an input signal processing unit 1, a signal multiplexing and learning unit 2, an analog transmitting unit 3, an analog characteristic extraction unit 4, and a learning execution unit 5.

The input signal processing unit 1 adjusts the symbol rate of each piece of spread data to the least common multiple of the respective symbol rates of the two or more pieces of spread data input from the outside, for output to the signal multiplexing and learning unit 2.

The signal multiplexing and learning unit 2 is constituted by a neural network. The signal multiplexing and learning unit 2 receives, as input to the neural network, the two or more pieces of spread data whose symbol rates have been adjusted by the input signal processing unit 1, and outputs, to the analog transmitting unit 3, results output according to parameters of the neural network as signal multiplexing results. That is, the signal multiplexing and learning unit 2 multiplexes the two or more pieces of spread data after the symbol rate adjustment, using the neural network, to generate a multiplex signal in which the two or more pieces of spread data are multiplexed.

The analog transmitting unit 3 performs analog processing such as amplification and noise removal on the multiplex signal input from the signal multiplexing and learning unit 2 to shape the waveform of the multiplex signal, and transmits the waveform shaped multiplex signal. A means by which the analog transmitting unit 3 performs amplification, noise removal, etc. on a multiplex signal to generate a transmission signal that is a waveform shaped multiplex signal can be implemented by a general configuration as is conventionally done, and thus will not be described.

The analog characteristic extraction unit 4 extracts linear distortion and nonlinear distortion of the analog transmitting unit 3, and outputs the extracted linear distortion and nonlinear distortion as analog characteristics to the learning execution unit 5. A means by which the analog characteristic extraction unit 4 extracts linear distortion and nonlinear distortion from the analog transmitting unit 3 can be implemented by a general configuration as is conventionally done, and thus will not be described.

The learning execution unit 5 updates the parameters of the neural network constituting the signal multiplexing and learning unit 2, based on the analog characteristics obtained from the analog characteristic extraction unit 4 and preset constraints on a multiplex signal.

The present embodiment provides description on the assumption that two or more pieces of spread data generated outside are input to the transmitting apparatus 100. However, processing to spread each of two or more pieces of data to generate two or more pieces of spread data may be performed inside the transmitting apparatus 100. Processing by the input signal processing unit 1 to adjust symbol rates may be performed outside the transmitting apparatus 100. That is, the input signal processing unit 1 may be omitted, and two or more pieces of spread data after symbol rate adjustment may be input to the transmitting apparatus 100.

Next, hardware that implements the transmitting apparatus 100 will be described. The transmitting apparatus 100 can be implemented by hardware of a configuration illustrated in FIG. 2 or FIG. 3.

Figure 2:
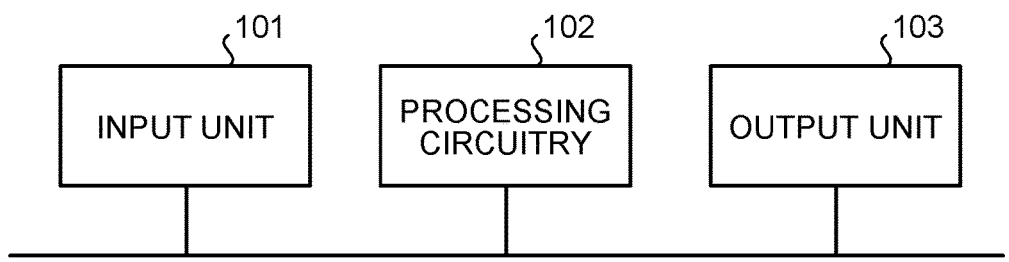
FIG. 2 is a diagram illustrating a first configuration example of hardware that implements the transmitting apparatus according to the present.
Figure 3:
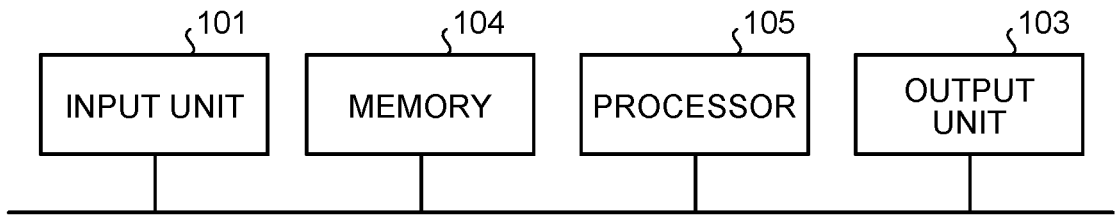
FIG. 3 is a diagram illustrating a second configuration example of hardware that implements the transmitting apparatus according to the present.

FIG. 2 is a diagram illustrating a first configuration example of the hardware that implements the transmitting apparatus 100 according to the present disclosure. FIG. 3 is a diagram illustrating a second configuration example of the hardware that implements the transmitting apparatus 100 according to the present disclosure. FIG. 2 illustrates a hardware configuration when the principal parts of the transmitting apparatus 100, specifically, the input signal processing unit 1, the signal multiplexing and learning unit 2, the analog characteristic extraction unit 4, and the learning execution unit 5 are implemented by processing circuitry 102 that is dedicated hardware. The processing circuitry 102 is, for example, an application-specific integrated circuit (ASIC), a field-programmable gate array (FPGA), or a circuit combining them. In the example illustrated in FIG. 2, the input signal processing unit 1, the signal multiplexing and learning unit 2, the analog characteristic extraction unit 4, and the learning execution unit 5 are implemented by the single processing circuitry 102, but are not limited to this. The hardware may include a plurality of processing circuitry 102, and the input signal processing unit 1, the signal multiplexing and learning unit 2, the analog characteristic extraction unit 4, and the learning execution unit 5 may each be implemented by different processing circuitry 102.

An input unit 101 is a circuit that receives input signals to the transmitting apparatus 100, that is, two or more pieces of spread data from the outside. An output unit 103 is a circuit that outputs a multiplex signal generated by the transmitting apparatus 100 to the outside and implements the analog transmitting unit 3.

Symbol rate adjustment processing performed by the input signal processing unit 1 may be performed by the input unit 101. That is, the input unit 101 may implement the input signal processing unit 1.

FIG. 3 illustrates a hardware configuration when the processing circuitry 102 illustrated in FIG. 2 is implemented by a memory 104 and a processor 105, that is, a hardware configuration when the principal parts of the transmitting apparatus 100 are implemented by the memory 104 and the processor 105. The memory 104 is, for example, nonvolatile or volatile memory such as random-access memory (RAM), read-only memory (ROM), flash memory, an erasable programmable read-only memory (EPROM), or an electrically erasable programmable read-only memory (EEPROM) (registered trademark). The processor 105 is a central processing unit (CPU, also called a central processor, a processing unit, an arithmetic unit, a microprocessor, a microcomputer, or a digital signal processor (DSP)).

When the principal parts of the transmitting apparatus 100 are implemented by the memory 104 and the processor 105, the processor 105 executes a program describing processing to operate as the input signal processing unit 1, the signal multiplexing and learning unit 2, the analog characteristic extraction unit 4, and the learning execution unit 5, so that these units are implemented. The program describing the processing to operate as the input signal processing unit 1, the signal multiplexing and learning unit 2, the analog characteristic extraction unit 4, and the learning execution unit 5 is stored in advance in the memory 104. The processor 105 reads and executes the program stored in the memory 104 to operate as the input signal processing unit 1, the signal multiplexing and learning unit 2, the analog characteristic extraction unit 4, and the learning execution unit 5.

Part of the input signal processing unit 1, the signal multiplexing and learning unit 2, the analog characteristic extraction unit 4, and the learning execution unit 5 may be implemented by the memory 104 and the processor 105, and the rest may be implemented by dedicated hardware like the processing circuitry 102 illustrated in FIG. 2.

The program, which is stored in the memory 104 in advance, is not limited to this. The program may be in the form of being supplied to a user in a state of being written to a storage medium such as a compact disc (CD)-ROM or a digital versatile disc (DVD)-ROM, and installed in the memory 104 by the user.

Next, the operation of the transmitting apparatus 100 will be described. The transmitting apparatus 100 according to the present embodiment trains the neural network based on the analog characteristics of the analog circuit constituting the analog transmitting unit 3 and constraints on a multiplex signal, and generates the multiplex signal with the trained neural network to generate the multiplex signal in which the analog characteristics of the analog circuit have been compensated for. This can provide the effect that even when the transmitting apparatus 100 is mounted on a satellite and operated for a long period of time, for example, the transmitting apparatus 100 can continue to transmit signals without degrading the signal characteristics.

Figure 4:
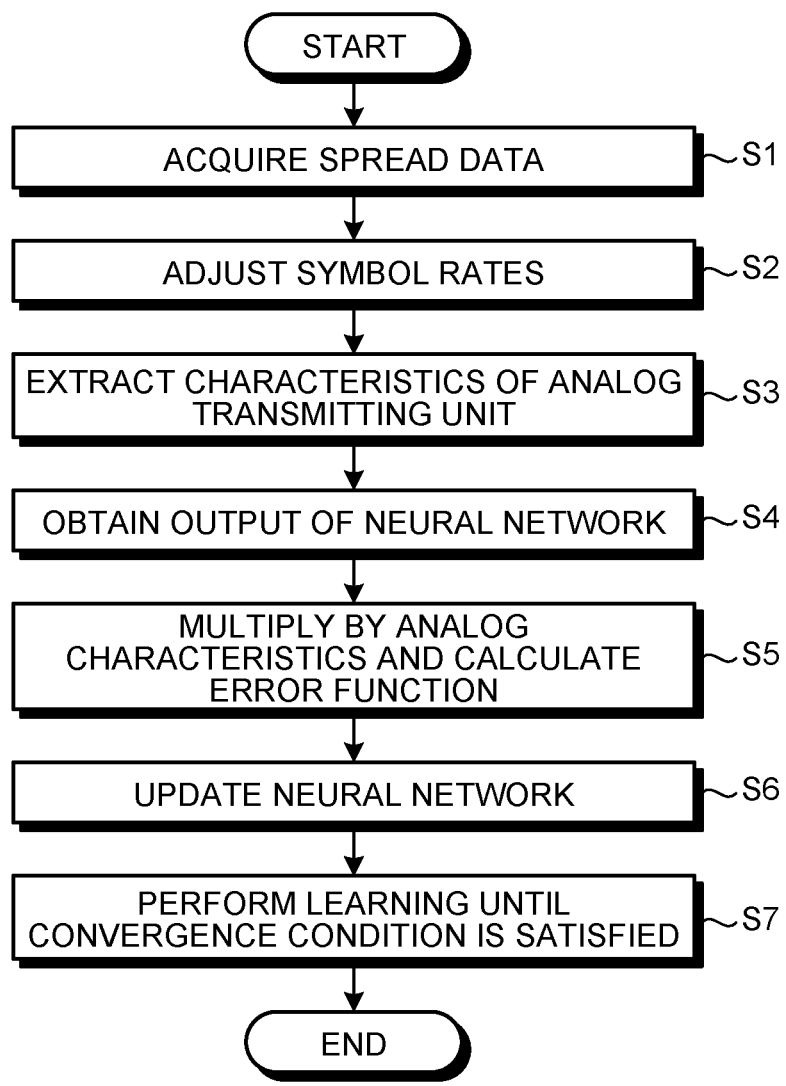
FIG. 4 is a flowchart illustrating an example of an operation to train a neural network of a signal multiplexing and learning unit that is a component of the transmitting apparatus according to the first embodiment.

First, an operation to train the neural network of the signal multiplexing and learning unit 2 will be described. FIG. 4 is a flowchart illustrating an example of the operation to train the neural network of the signal multiplexing and learning unit 2 that is a component of the transmitting apparatus 100 according to the first embodiment.

The transmitting apparatus 100 acquires two or more pieces of spread data (step S1). Here, as an example, the description will be continued on the assumption that four signals, signals A to D at symbol rates as illustrated in FIG. 5 are input to the transmitting apparatus 100 from the outside. That is, the input signal processing unit 1 acquires the signals A to D. FIG. 5 is a diagram illustrating an example of two or more signals input to the transmitting apparatus 100 according to the first embodiment. As illustrated in FIG. 5, the symbol rates of the signals A to D are different from each other, and the center frequency is f1 for the signal A and the signal D, and f2 for the signal B and the signal C. Further, the signals A to D have different signal constraints (transmission power ratios and phases). Although the example where the transmission power ratios and the phases represent the constraints has been described, constraint elements are not limited to these. The constraints on the signals illustrated in FIG. 5 are different from the constraints on the multiplex signal generated by the signal multiplexing and learning unit 2. The constraints on the multiplex signal are defined separately.

Next, the input signal processing unit 1 adjusts the symbol rates of the acquired spread data (step S2). When the four signals illustrated in FIG. 5 are multiplexed, the least common multiple of the respective symbol rates is 12.276 MHz. Thus, the input signal processing unit 1 performs oversampling of the signal A twelve times, the signal B six times, and the signal C two times to make the symbol rates of all the pieces of spread data match. As a result of making the symbol rates match, when the signals to be multiplexed take M values, and the number of the signals to be multiplexed is N, possible values are MAN ($M^N$). In this example, since the four signals that take two values are multiplexed, M=2 and N=4, and possible values of the four signals are any combination of $2^4=16$ patterns as illustrated in FIG. 6. FIG. 6 is a diagram illustrating the possible patterns of the signals to be multiplexed by the transmitting apparatus 100 according to the first embodiment. In a case where the symbol rates are not adjusted to multiplex the signals kept at the different symbol rates, this operation can be omitted.

Figure 7:
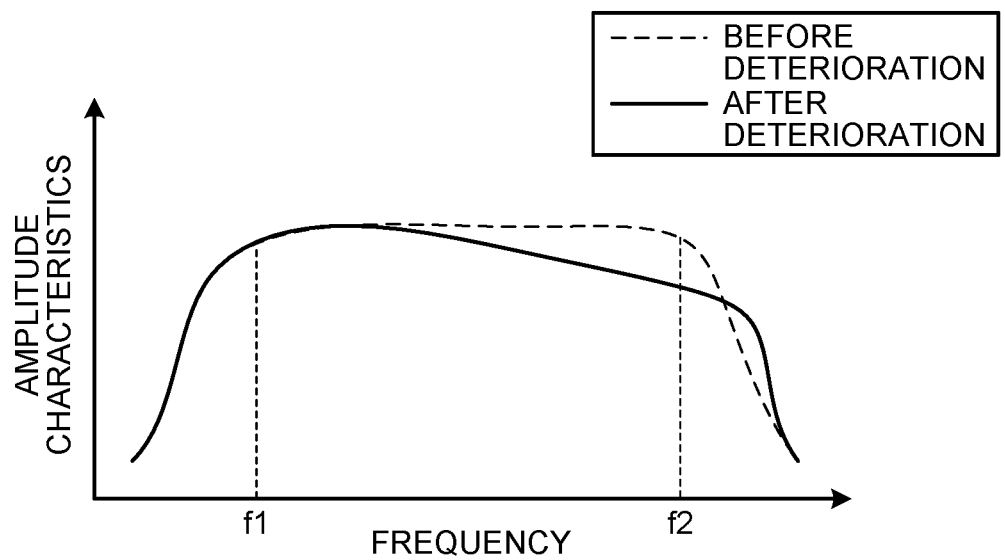
FIG. 7 is a diagram illustrating an example of analog characteristics extracted by an analog characteristic extraction unit of the transmitting apparatus according to the first embodiment.

Next, the analog characteristic extraction unit 4 extracts the characteristics of the analog transmitting unit 3 to acquire the analog characteristics (step S3). The analog characteristics are extracted by, for example, taking the difference between a signal mimicking the output of the signal multiplexing and learning unit 2 and a signal output from the analog transmitting unit 3 when the mimic signal is input to the analog transmitting unit 3. By this processing, frequency-amplitude characteristics as illustrated in FIG. 7 are obtained. FIG. 7 is a diagram illustrating an example of the analog characteristics extracted by the analog characteristic extraction unit 4 of the transmitting apparatus 100 according to the first embodiment. In FIG. 7, a broken line indicates the characteristics of the signal before the analog characteristics of the analog transmitting unit 3 become deteriorated. A solid line indicates the characteristics of the signal after the analog transmitting unit 3 has become deteriorated. In the example illustrated in FIG. 7, before the analog transmitting unit 3 becomes deteriorated, both f1 and f2, which are the center frequencies of signals to be multiplexed, have the same amplitude characteristics as indicated by the broken line. On the other hand, after the analog transmitting unit 3 has become deteriorated due to a long-term operation of the satellite, the amplitude characteristics at the frequency f2 become deteriorated as indicated by the solid line. In this case, the signals of the center frequency f2 are not properly amplified, and the signal characteristics become deteriorated. To cope with this deterioration in the amplitude characteristics, the amplitude of the signals corresponding to the frequency f2 may be increased. This processing is performed by the learning execution unit 5.

Next, the learning execution unit 5 executes steps S4 to S7 to update the parameters of the neural network of the signal multiplexing and learning unit 2.

Figure 8:
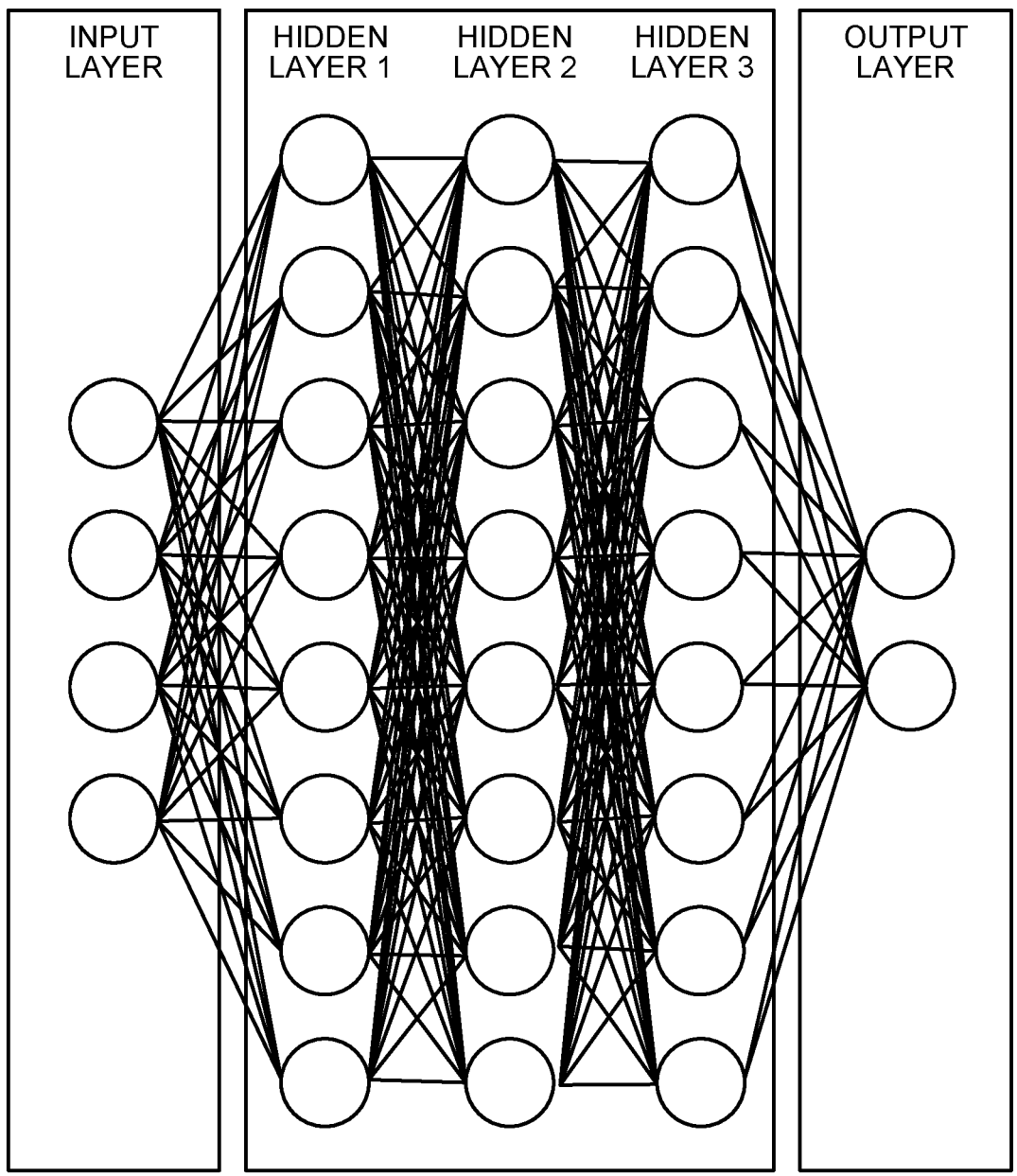
FIG. 8 is a diagram illustrating a configuration example of a neural network applied to the signal multiplexing and learning unit of the transmitting apparatus according to the first embodiment.

Here, the neural network will be described. FIG. 8 is a diagram illustrating a configuration example of the neural network applied to the signal multiplexing and learning unit 2 of the transmitting apparatus 100 according to the first embodiment. As illustrated in FIG. 8, the neural network is composed of an input layer, an arbitrary number of hidden layers that are intermediate layers, and an output layer. The input layer of the neural network includes a plurality of input nodes (neurons) (four in the example illustrated in FIG. 8). The number of the hidden layers is two or more (three in the example illustrated in FIG. 8). The output layer includes output nodes that represent signal multiplexing results (two, a real-value output node and an imaginary-value output node in the example illustrated in FIG. 8). The number of the layers and the number of the nodes (the number of the neurons) are an example. In the neural network, the nodes in the input layer and the hidden layers are fully connected (a fully connected layer), and the nodes in the hidden layers and the output layer are fully connected. There are arbitrary numbers of nodes in the input layer, the hidden layers, and the output layer. Each node is a function that takes an input and outputs a value. The input layer includes a bias node to which an independent value is input in addition to the input nodes. The configuration is constructed by stacking the layers with the multiple nodes. Each node in each layer weights a received input and converts the received input with an activation function for output to the next layer. The activation function is a nonlinear function such as a sigmoid function or the rectified linear unit function (ReLU).

First, the learning execution unit 5 obtains output of the neural network when spread data after symbol rate adjustment is input from the input signal processing unit 1 to the signal multiplexing and learning unit 2 (step S4). The output obtained here is output results of the neural network before update.

Next, the learning execution unit 5 multiplies the output results obtained in step S4 by the analog characteristics of the analog transmitting unit 3 and calculates an error function (step S5). The error function is a function to calculate whether the output results of the neural network satisfy the constraints on the multiplex signal. The constraints on the multiplex signal are, for example, the amplitude ratio, the phase difference in despreading results between the signals, etc. when replica signals with spreading codes are despread by a receiving apparatus that has received the multiplex signal.

Figure 9:
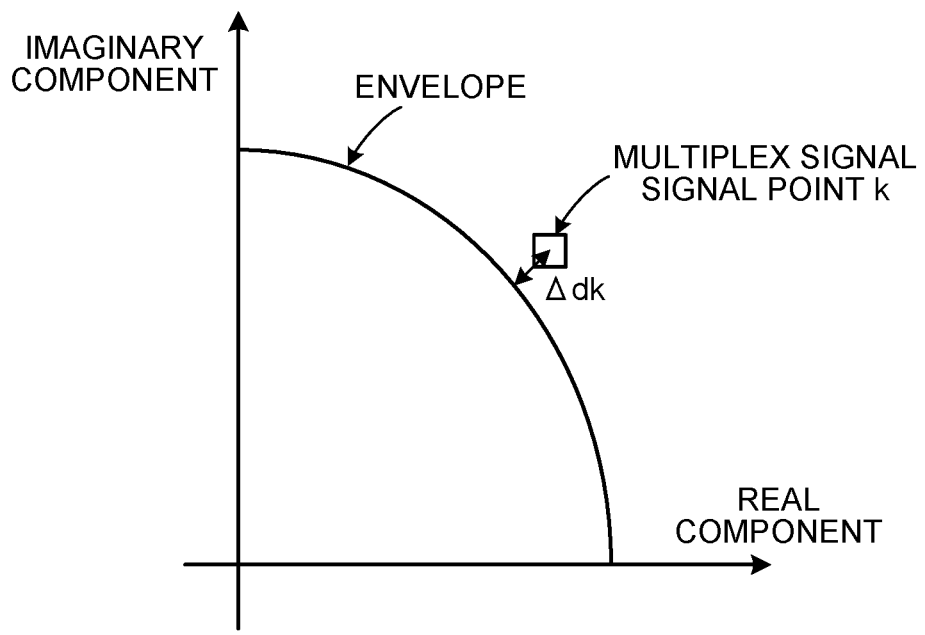
FIG. 9 is a first diagram for explaining a method of calculating an error function of a learning execution unit according to the first embodiment.
Figure 10:
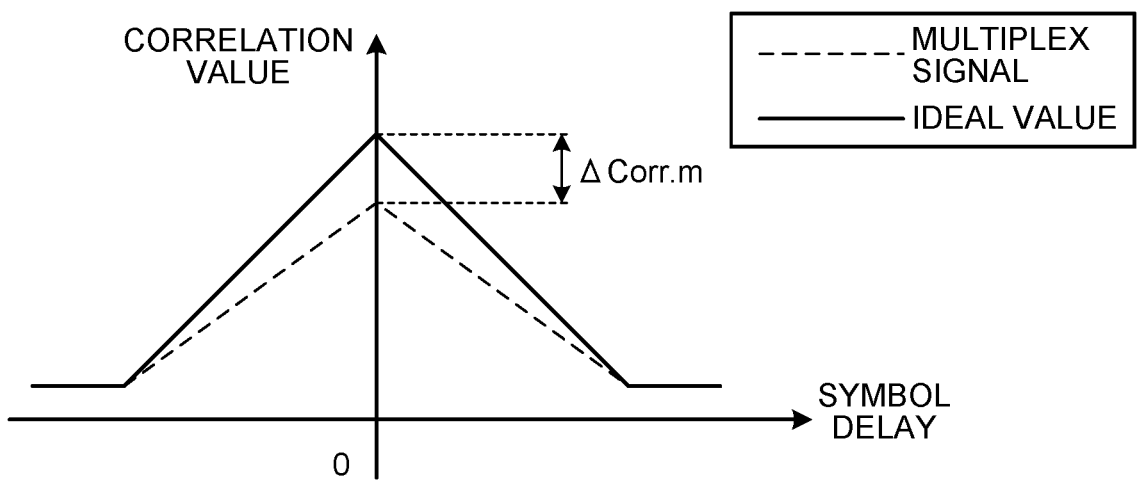
FIG. 10 is a second diagram for explaining a method of calculating an error function of the learning execution unit according to the first embodiment.

Examples of methods of calculating error functions will be described with reference to FIGS. 9 and 10. FIG. 9 is a first diagram for explaining a method of calculating an error function of a learning execution unit 5 according to the first embodiment. FIG. 10 is a second diagram for explaining a method of calculating an error function of the learning execution unit 5 according to the first embodiment.

FIG. 9 illustrates the result of mapping the signal point of the two results output from the neural network as a real component and an imaginary component. In FIG. 9, a square (□) indicates the signal point k of the multiplex signal. $\Delta d_k$ is the distance from the coordinate position of the signal point k of the multiplex signal (the square in the figure) to a target envelope (a solid line in the figure). In the case of the example illustrated in FIG. 9, in step S5 to calculate the error function, the learning execution unit 5 calculates $\Delta d_k$ for all possible signal points, in the case of the present embodiment, each of the signal points of the sixteen patterns illustrated in FIG. 6, and takes the sum of them as one of the error functions.

In FIG. 10, a broken line indicates the results of calculating the correlation between the multiplex signal and each signal obtained by shifting a replica signal of a signal m to be multiplexed while changing the amount of shift in units of symbols (the relationship between the symbol delay and the correlation value). A solid line indicates ideal values, specifically, indicates the results of calculating the correlation between the replica signal of the signal m and each signal obtained by shifting the replica signal of the signal m while changing the amount of shift in units of symbols. The signal m is one of the two or more signals multiplexed by the signal multiplexing and learning unit 2. In the case of the example illustrated in FIG. 10, in step S5 to calculate the error function, the learning execution unit 5 calculates the difference $\Delta Corr.m$ between the peaks of the two correlation values (the correlation value indicated by the broken line and the correlation value indicated by the solid line in FIG. 10) (the values at a symbol delay of 0) for all the signals to be multiplexed, in the case of the present embodiment, the above-mentioned four signals, the signals A to D, and takes the sum of them as one of the error functions.

The sum of the above two error functions described with reference to FIGS. 9 and 10 is taken as a final error function. This error function is represented by formula (1) below. To increase the generalization ability, the second term is multiplied by a regularization term p that takes a positive value. The error function takes a positive value of zero or more. The smaller this value, the better the performance of the multiplex signal generated by the neural network expressed.

[Formula 1]

$$Err = \sum_{k=0}^{K-1} \Delta d_k + \mu \sum_{m=0}^{M-1} \Delta Corrm \quad (1)$$

Next, the learning execution unit 5 updates the neural network of the signal multiplexing and learning unit (step S6). Specifically, the learning execution unit 5 performs a learning operation to update the weights in each layer, which are the parameters of the neural network. In this learning operation, the learning execution unit 5 calculates the error function represented by formula (1), and based on that, adjusts the weights in each layer of the neural network. The learning operation is to solve an optimization problem that minimizes an error. For the solution of the optimization problem, backpropagation is typically used. In backpropagation, the error is propagated from the output layer to adjust the weights in each layer. Specifically, backpropagation is a method to calculate the amounts of update of the weights in each layer using values obtained from the output layer side, and propagate the values that determine the amounts of update of the weights in each layer in the direction of the input layer while calculating the values.

The learning execution unit 5 calculates the differences between the characteristics of the signal output by the neural network of the signal multiplexing and learning unit 2 and the characteristics of an ideal multiplex signal, using the error function, and performs learning, repeatedly updating the weights in each layer of the neural network until a given convergence condition is satisfied, for example, the condition that the learning is performed over a predetermined number of times, the error function falls below a predetermined threshold value, or the like is satisfied (step S7).

The transmitting apparatus 100 trains the neural network of the signal multiplexing and learning unit 2 as described above.

The following describes the operation of the transmitting apparatus 100 to transmit a multiplex signal using the trained signal multiplexing and learning unit 2 in which the neural network has been trained through the procedure illustrated in FIG. 4. FIG. 11 is a flowchart illustrating an example of the operation of the transmitting apparatus 100 to transmit a multiplex signal according to the first embodiment.

The transmitting apparatus 100 acquires two or more pieces of spread data (step S1) and adjusts the symbol rates of the acquired pieces of spread data (step S2) as in the operation at the time of learning described above. These processes are the same as those in steps S1 and S2 illustrated in FIG. 4, and thus will not be described.

Figure 13:
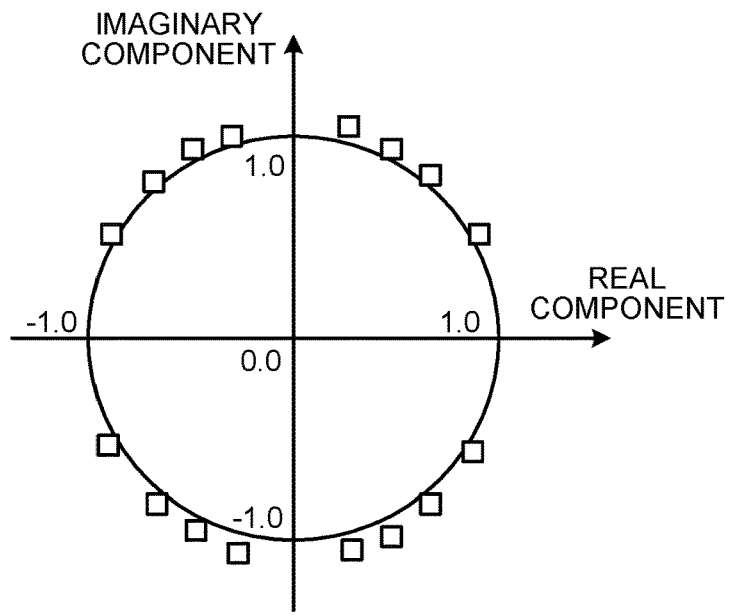
FIG. 13 is a diagram illustrating the results of mapping the input and output results illustrated in FIG. 12 to signal points.

Next, the signal multiplexing and learning unit 2 multiplexes the pieces of spread data whose symbol rates have been adjusted by the input signal processing unit 1, using the trained neural network to generate a multiplex signal (step S8). That is, the signal multiplexing and learning unit 2 inputs the pieces of spread data after the symbol rate adjustment received from the input signal processing unit 1 to the neural network, and outputs a signal output by the neural network accordingly to the analog transmitting unit 3 as a multiplex signal. FIG. 12 illustrates a pattern table showing the relationships between the input and output of the neural network at this time. FIG. 12 is a diagram illustrating an example of the input and output results of the signal multiplexing and learning unit 2 that is a component of the transmitting apparatus 100 according to the first embodiment. In the present embodiment, as illustrated in the figure, the pattern table is composed of inputs #1 to #4, an output #1 indicating a real component, and an output #2 indicating an imaginary component. As described above, input values are "0" and "1". The real component and the imaginary component indicate the mapping position of a signal obtained by the values of the inputs #1 to #4. FIG. 13 illustrates the multiplex signal mapped to the real component and the imaginary component. FIG. 13 is a diagram illustrating the results of mapping the input and output results illustrated in FIG. 12 to signal points. The coordinate position of the mapped multiplex signal is indicated by the real component and the imaginary component. FIG. 13 illustrates that any complex signal (multiplex signal) appears in a form close to a concentric circle. The coordinate positions of the mapped signals are not limited to being on a constant envelope. They have slight differences from the envelope to compensate for the amplitude characteristics at the f2 frequency.

Next, the analog transmitting unit 3 executes amplification processing, filter processing for noise removal, etc. on the multiplex signal output from the signal multiplexing and learning unit 2, and then transmits the multiplex signal (step S9). In the multiplex signal transmitted by the analog transmitting unit 3, the deteriorated characteristics of the analog transmitting unit 3 have been compensated for.

As described above, the transmitting apparatus 100 according to the present embodiment trains the neural network constituting the signal multiplexing and learning unit 2, based on the analog characteristics of the analog circuit constituting the analog transmitting unit 3 and the constraints on a multiplex signal, and generates the multiplex signal using the trained neural network. Consequently, the multiplex signal in which the analog characteristics of the analog circuit have been compensated for can be generated. Further, since the multiplex signal is generated by the neural network, it is possible to prevent an increase in design difficulty. The transmitting apparatus 100 can generate a multiplex signal taking the analog characteristics into consideration while avoiding an increase in design difficulty. Further, the transmitting apparatus 100 can achieve the effect that even when the transmitting apparatus 100 is mounted on a satellite and operated for a long period of time, it can continue to transmit signals without degrading the signal characteristics.

Second Embodiment

The transmitting apparatus 100 according to the first embodiment described above internally trains the neural network of the signal multiplexing and learning unit 2, and after the training, generates and transmits a multiplex signal. However, there is a possibility that the computer resources of the hardware implementing the transmitting apparatus 100 are under tight conditions, and learning cannot be performed onboard. Therefore, the present embodiment describes a transmitting apparatus that utilizes the computer resources of another apparatus, performs learning on the other apparatus, and updates parameters of a neural network, using parameters learned on the other apparatus.

Figure 14:
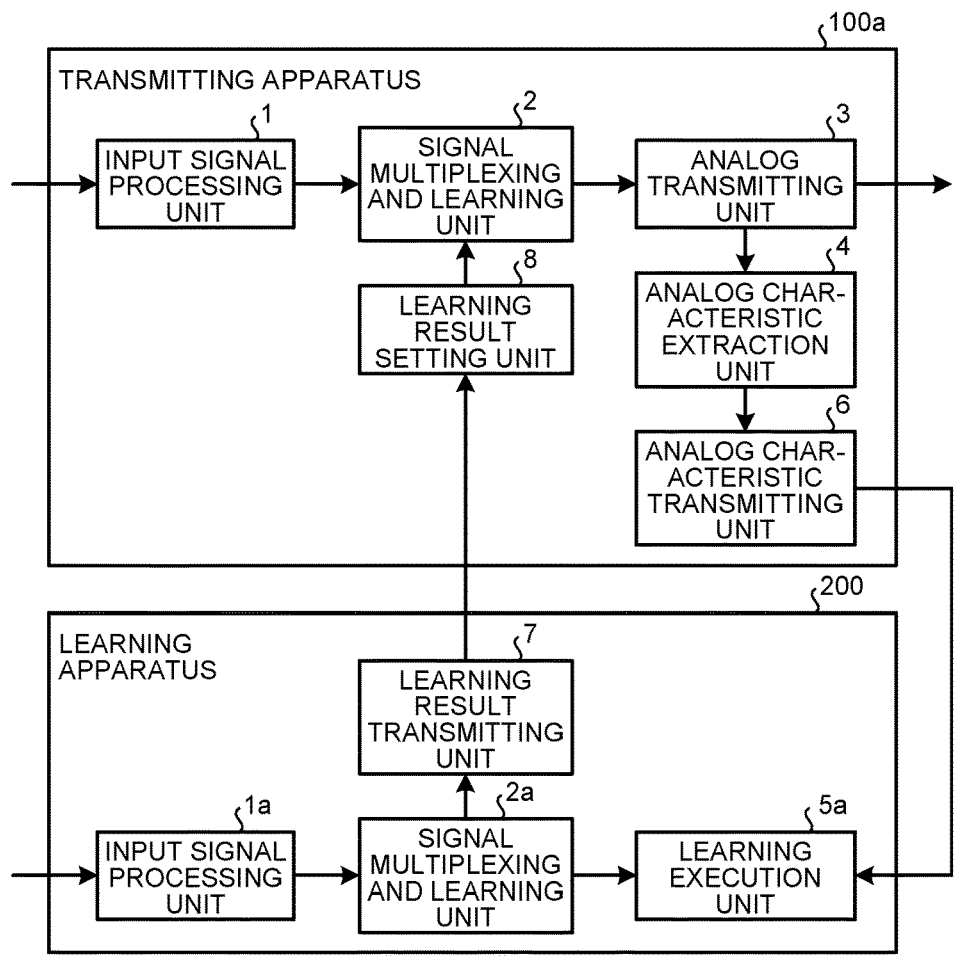
FIG. 14 is a diagram illustrating a functional configuration example of a transmitting apparatus and a learning apparatus according to a second embodiment.

FIG. 14 is a diagram illustrating a functional configuration example of a transmitting apparatus 100a and a learning apparatus 200 according to a second embodiment.

The transmitting apparatus 100a according to the present embodiment has a configuration in which an analog characteristic transmitting unit 6 and a learning result setting unit 8 are added to the transmitting apparatus 100 according to the first embodiment. The components other than the analog characteristic transmitting unit 6 and the learning result setting unit 8 are the same as the components of the transmitting apparatus 100 according to the first embodiment, and thus are given the same reference numerals to omit duplicate explanations.

The learning apparatus 200 according to the present embodiment includes an input signal processing unit 1a, a signal multiplexing and learning unit 2a, a learning execution unit 5a, and a learning result transmitting unit 7. The input signal processing unit 1a, the signal multiplexing and learning unit 2a, and the learning execution unit 5a of the learning apparatus 200 perform the same processing as the input signal processing unit 1, the signal multiplexing and learning unit 2, and the learning execution unit 5 of the transmitting apparatus 100 according to the first embodiment, respectively. Thus, details of the input signal processing unit 1a, the signal multiplexing and learning unit 2a, and the learning execution unit 5a will not be described. The learning execution unit 5a acquires the analog characteristics of the analog transmitting unit 3 included in the transmitting apparatus 100a from the transmitting apparatus 100a, and updates parameters of a neural network constituting the signal multiplexing and learning unit 2a, using acquired analog information. The parameters of the neural network are passed to the transmitting apparatus 100a and used when the signal multiplexing and learning unit 2 generates a multiplex signal.

The analog characteristic transmitting unit 6 of the transmitting apparatus 100a transmits the analog characteristics extracted by the analog characteristic extraction unit 4 to the learning execution unit 5a of the learning apparatus 200. A means by which the analog characteristic transmitting unit 6 transmits the analog characteristics can be implemented by a general configuration as is conventionally done, and thus will not be described.

The learning result transmitting unit 7 of the learning apparatus 200 transmits the parameters of the neural network after learning has been completed by the signal multiplexing and learning unit 2a to the learning result setting unit 8 of the transmitting apparatus 100a. A means by which the learning result transmitting unit 7 transmits the parameters of the neural network can be implemented by a general configuration as is conventionally done, and thus will not be described.

The learning result setting unit 8 of the transmitting apparatus 100a receives the parameters of the trained neural network from the learning result transmitting unit 7 of the learning apparatus 200, and writes the received parameters to the neural network of the signal multiplexing and learning unit 2.

Next, the operation of the transmitting apparatus 100a will be described. In the present embodiment, even if the computer resources of the transmitting apparatus 100a are exhausted, and learning cannot be performed onboard, the training of the neural network is performed, utilizing the computer resources of another apparatus (the learning apparatus 200 in the present embodiment). Specifically, the learning apparatus 200 trains the neural network based on the analog characteristics of the analog circuit constituting the analog transmitting unit 3 of the transmitting apparatus 100a and constraints on a multiplex signal, and applies the results of the training to the neural network of the signal multiplexing and learning unit 2 of the transmitting apparatus 100a. Consequently, the transmitting apparatus 100a can generate a multiplex signal in which the analog characteristics of the analog circuit have been compensated for, like the transmitting apparatus 100 according to the first embodiment.

Figure 15:
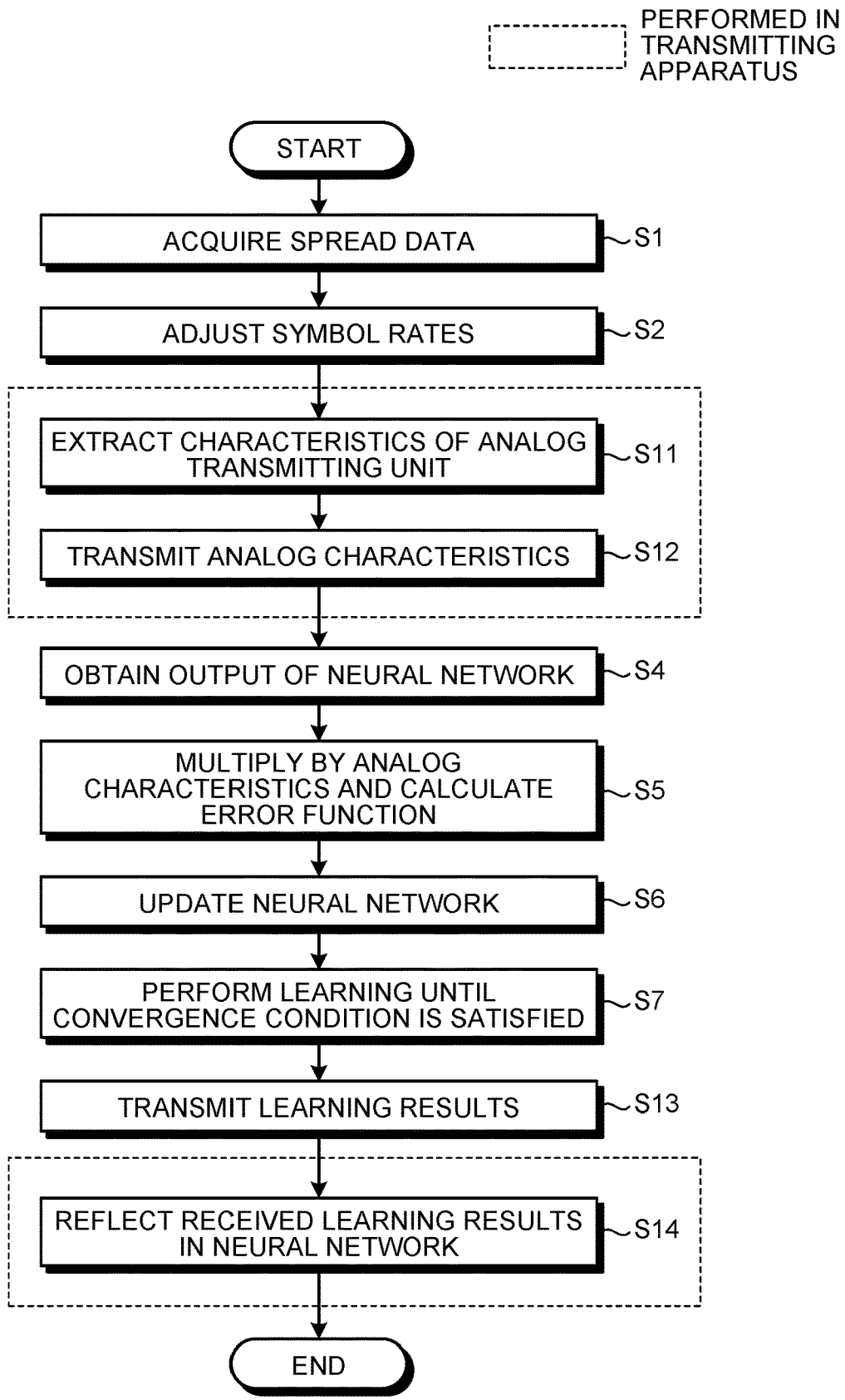
FIG. 15 is a flowchart illustrating an example of an operation to train a neural network of a signal multiplexing and learning unit that is a component of the transmitting apparatus according to the second embodiment.

An operation to train the neural network of the signal multiplexing and learning unit 2 will be described. FIG. 15 is a flowchart illustrating an example of the operation to train the neural network of the signal multiplexing and learning unit 2 that is a component of the transmitting apparatus 100a according to the second embodiment. The same operation as in the first embodiment will not be described in detail. Steps S1, S2, and S4 to S7 illustrated in FIG. 15 are the same as the steps given the same numbers in FIG. 4 indicating the operation of the first embodiment. Parts surrounded by broken lines in FIG. 15 are operations performed in the transmitting apparatus 100a, and the others are operations performed in the learning apparatus 200.

First, the input signal processing unit 1a of the learning apparatus 200 acquires spread data from the outside (step S1) and adjusts the symbol rates of the spread data (step S2).

Next, the analog characteristic extraction unit 4 of the transmitting apparatus 100a extracts the characteristics of the analog transmitting unit 3 to obtain analog characteristics (step S11). The analog characteristic extraction unit 4 extracts the characteristics in the same manner as in step S3 illustrated in FIG. 4, and outputs the obtained analog characteristics to the analog characteristic transmitting unit 6.

Next, the analog characteristic transmitting unit 6 transmits the analog characteristics extracted by the analog characteristic extraction unit 4 in step S11 to the learning apparatus 200 (step S12). Here, the analog characteristics are written, for example, to a storage area included in the analog characteristic transmitting unit 6, and after having undergone data compression processing etc., transmitted from the transmitting apparatus 100a to the learning apparatus 200 by wireless communication through antennas installed at both apparatuses.

Next, the learning execution unit 5a of the learning apparatus 200 executes steps S4 to S7 to update the parameters of the neural network of the signal multiplexing and learning unit 2a. This operation is the same as the operation in steps S4 to S7 in FIG. 4 described in the first embodiment, but is different in using analog characteristics acquired in another apparatus, that is, the analog characteristics acquired in the transmitting apparatus 100a.

When the update of the neural network parameters by the learning execution unit 5a is completed, then, the learning result transmitting unit 7 transmits the learning results to the transmitting apparatus 100a (step S13). In this step S13, the learning results, that is, the parameters after the update of the neural network of the signal multiplexing and learning unit 2a are written, for example, to a storage area included in the learning result transmitting unit 7, and after having undergone data compression processing etc., transmitted from the learning apparatus 200 to the transmitting apparatus 100a by wireless communication through the antennas installed at both apparatuses.

Next, the learning result setting unit 8 of the transmitting apparatus 100a changes the settings of the neural network parameters of the signal multiplexing and learning unit 2, referring to the learning results (parameters) of the neural network received from the learning apparatus 200. That is, the learning result setting unit 8 reflects the received learning results in the neural network of the signal multiplexing and learning unit 2 (step S14). As a result, the parameters of the neural network of the signal multiplexing and learning unit 2 have the same values as the parameters of the neural network of the signal multiplexing and learning unit 2a.

The operation of the transmitting apparatus 100a to generate and transmit a multiplex signal is the same as that of the transmitting apparatus 100 according to the first embodiment. Thus, the description thereof will be omitted.

As described above, the transmitting apparatus 100a according to the second embodiment transmits the analog characteristics of the analog circuit to the external learning apparatus 200, and causes the training of the neural network to be performed using transmitted analog data. The transmitting apparatus 100a updates the parameters of the neural network of the signal multiplexing and learning unit 2, based on the learning results in the learning apparatus 200. Consequently, even if the computer resources of the transmitting apparatus 100a are exhausted, and learning cannot be performed onboard, the parameters of the neural network of the signal multiplexing and learning unit 2 can be updated, and the same effects as those of the transmitting apparatus 100 according to the first embodiment can be obtained.

Third Embodiment

The transmitting apparatus 100 according to the first embodiment described above limits input to the neural network to that on a symbol-by-symbol basis. This is because an amount of information cannot be held in the time axis direction in the neural network, and any input is interpreted as input at the same time. Therefore, the present embodiment describes a transmitting apparatus that generates a multiplex signal made to hold information also in the time axis direction including the preceding and following symbols by converting input signals into matrix data and applying a convolutional neural network (CNN), which is a type of machine learning, to the converted matrix data.

Figure 16:
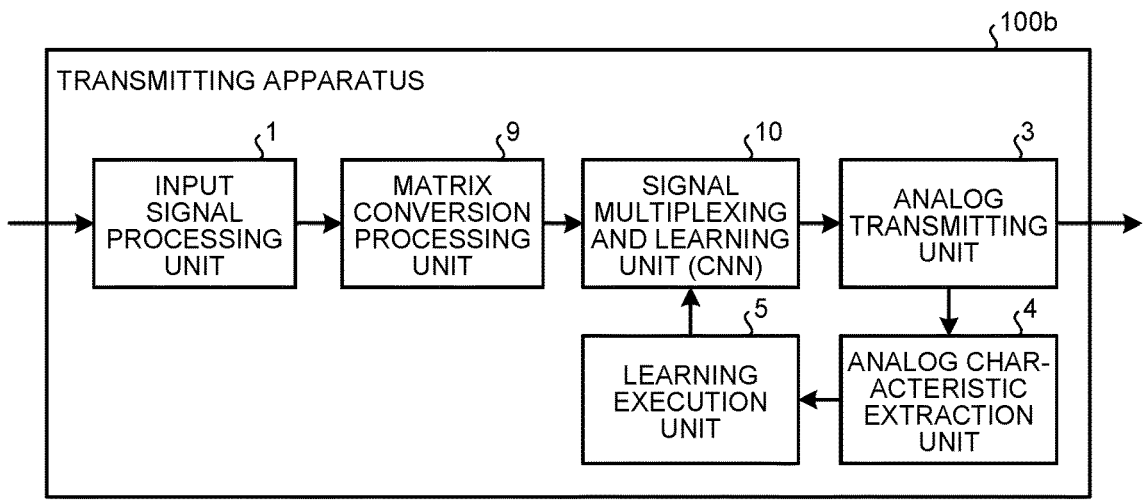
FIG. 16 is a diagram illustrating a functional configuration example of a transmitting apparatus according to a third embodiment.

FIG. 16 is a diagram illustrating a functional configuration example of a transmitting apparatus 100b according to a third embodiment. The transmitting apparatus 100b according to the present embodiment has a configuration in which a matrix conversion processing unit 9 is added to the transmitting apparatus 100 according to the first embodiment, and the signal multiplexing and learning unit 2 is replaced with a signal multiplexing and learning unit 10. The signal multiplexing and learning unit 10 is constituted by a CNN. The components other than the matrix conversion processing unit 9 and the signal multiplexing and learning unit 10 are the same as the components of the transmitting apparatus 100 according to the first embodiment, and thus are given the same reference numerals to omit duplicate explanations. The following describes differences from the first embodiment.

Two or more pieces of spread data after symbol rate adjustment are input from the input signal processing unit 1 to the matrix conversion processing unit 9. The matrix conversion processing unit 9 performs matrix conversion processing to divide the pieces of spread data input from the input signal processing unit 1 into predetermined lengths, and arrange their respective signal components in the row direction. The matrix conversion processing unit 9 outputs the spread data after the matrix conversion to the signal multiplexing and learning unit 10.

The signal multiplexing and learning unit 10 receives the spread data converted into a matrix received from the matrix conversion processing unit 9 as input to the convolutional neural network, and outputs, to the analog transmitting unit 3, results output according to parameters of the convolutional neural network as signal multiplexing results. That is, the signal multiplexing and learning unit 10 multiplexes the two or more pieces of spread data converted into the matrix, using the convolutional neural network, to generate a multiplex signal.

Next, the operation of the transmitting apparatus 100b will be described. The transmitting apparatus 100b according to the present embodiment that has adjusted the symbol rates of input signals that are two or more pieces of spread data converts them into a matrix for conversion into matrix data, and applies the convolutional neural network, which is a type of machine learning, to the converted matrix data to generate a multiplex signal made to hold information also in the time axis direction including the preceding and following symbols. Consequently, the multiplex signal can obtain high-performance signal characteristics that take into consideration influence between the preceding and following symbols.

Figure 17:
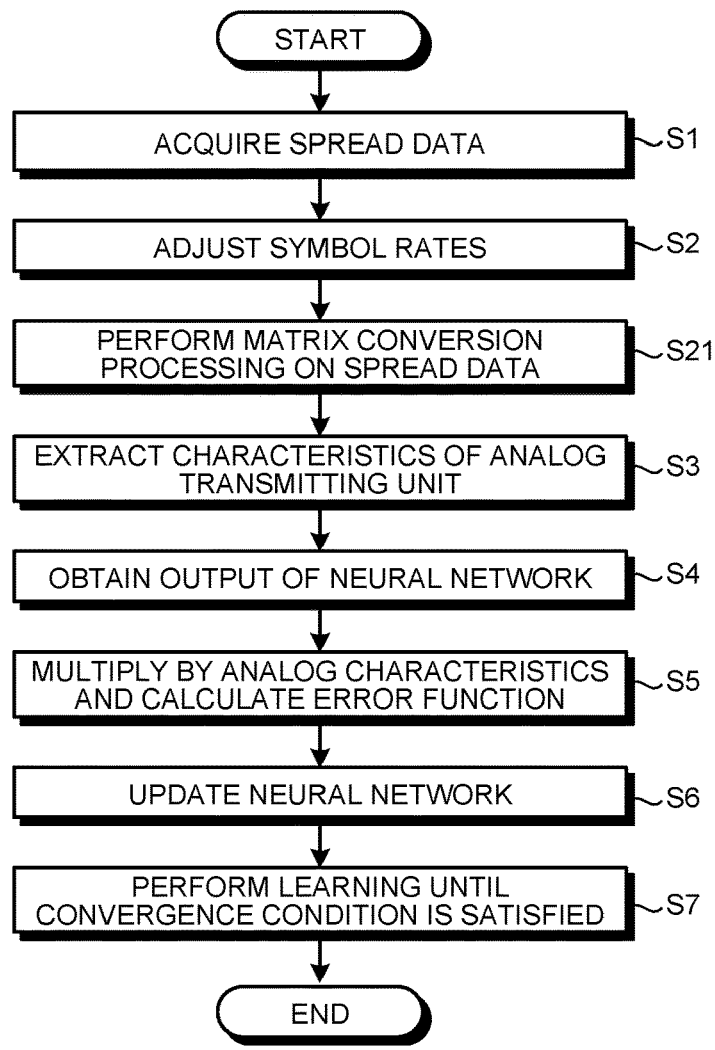
FIG. 17 is a flowchart illustrating an example of an operation to train a convolutional neural network of a signal multiplexing and learning unit that is a component of the transmitting apparatus according to the third embodiment.

An operation to train the convolutional neural network of the signal multiplexing and learning unit 10 will be described. FIG. 17 is a flowchart illustrating an example of the operation to train the convolutional neural network of the signal multiplexing and learning unit 10 that is a component of the transmitting apparatus 100b according to the third embodiment. The same operation as in the first embodiment will not be described in detail. Steps S1 to S7 illustrated in FIG. 17 are the same as the steps given the same numbers in FIG. 4 illustrating the operation of the first embodiment.

Each piece of spread data after symbol rate adjustment obtained by the input signal processing unit 1 executing steps S1 and S2 is input to the matrix conversion processing unit 9. The matrix conversion processing unit 9 performs matrix conversion processing on the spread data received from the input signal processing unit 1 (step S21). As an example, the signals A to D illustrated in FIG. 5 are input to the input signal processing unit 1. The symbol lengths of the symbol rate-adjusted signals A to D output by the input signal processing unit 1 are each 122760 symbols. The matrix conversion processing unit 9 divides each of the signals A to D of 122760 symbols received from the input signal processing unit 1 into 120-symbol pieces as matrix data of a single row. In this case, the matrix conversion processing unit 9 generates 1023 matrices with one row and 120 columns for each of the signals A to D. Subsequently, the matrix conversion processing unit 9 combines the respective matrices with one row and 120 columns of the signals A to D in the column direction into matrix data with four rows and 120 columns. That is, the matrix conversion processing unit 9 combines the matrix with one row and 120 columns of the signal A, the matrix with one row and 120 columns of the signal B, the matrix with one row and 120 columns of the signal C, and the matrix with one row and 120 columns of the signal D in the column direction to generate matrix data with four rows and 120 columns. There are also 1023 matrices with four rows and 120 columns.

Figure 18:
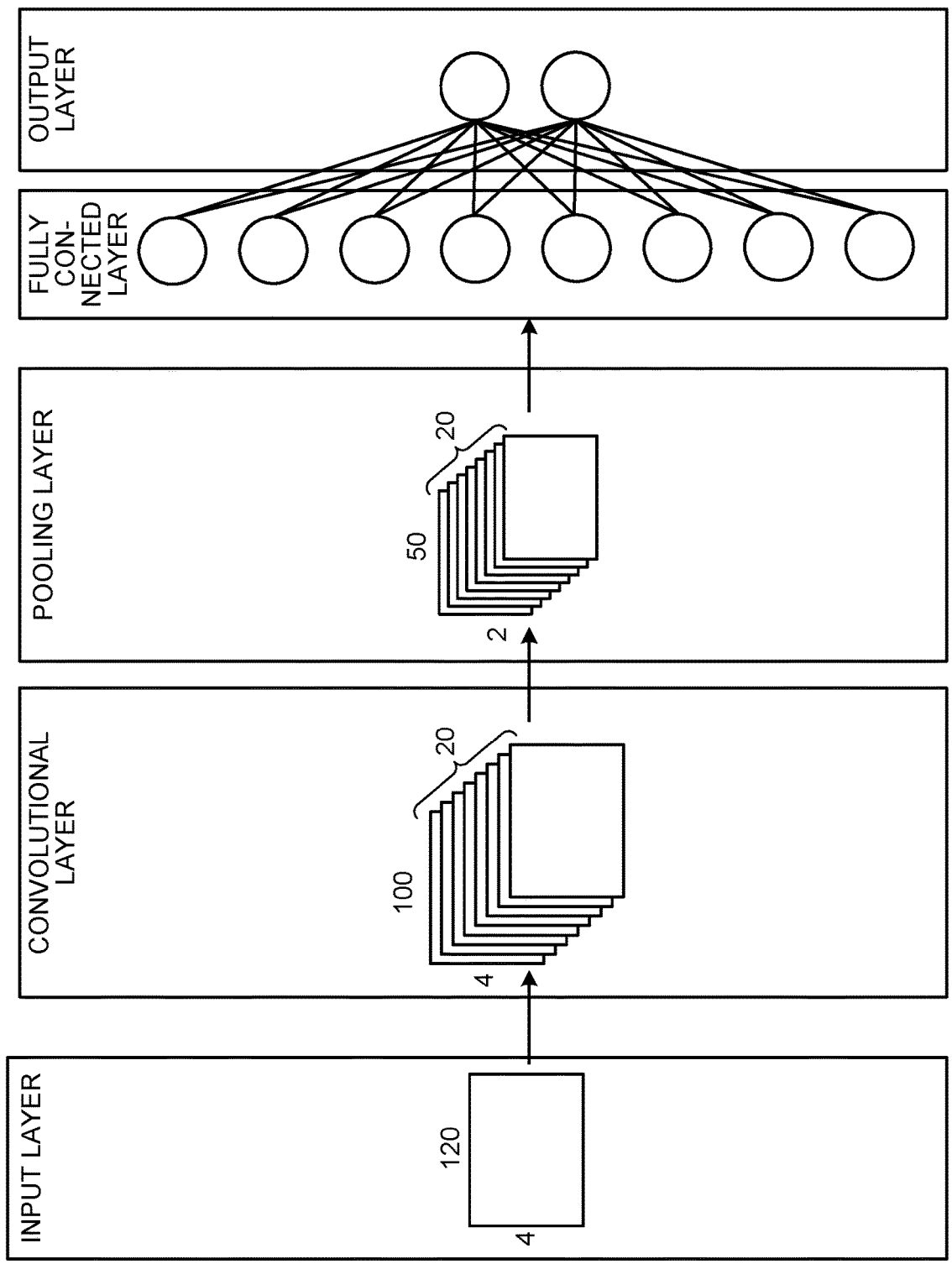
FIG. 18 is a diagram illustrating a configuration example of the convolutional neural network applied to the signal multiplexing and learning unit of the transmitting apparatus according to the third embodiment.

The signal multiplexing and learning unit 10 inputs the matrix data with four rows and 120 columns as one input to the convolutional neural network. Here, the convolutional neural network will be described. FIG. 18 is a diagram illustrating a configuration example of the convolutional neural network applied to the signal multiplexing and learning unit 10 of the transmitting apparatus 100b according to the third embodiment. As illustrated in FIG. 18, the convolutional neural network is composed of an input layer, a convolutional layer, a pooling layer, a fully connected layer, and an output layer. In the convolutional layer, a calculation to convolve a filter with an input matrix is performed. This calculation is basically the same processing as the convolution of a filter in general image processing, for example, convolution with a Gaussian filter, a sharpening filter, or the like. The results of execution of the convolution are then used as output of the convolutional layer through an activation function. In the pooling layer, the dimensions of the output results of the convolutional layer are reduced. For example, processing such as combining a region with two rows and two columns into one element is performed to reduce space size. For this calculation, max pooling, which extracts the maximum value from a region of interest, average pooling, which calculates the average value of a region of interest, or the like is used. The output results of the pooling layer are input to the same fully connected layer as that of the neural network described in the first embodiment. After calculation based on weights and bias in the fully connected layer is performed, the output results of the convolutional neural network are obtained in the output layer. Any processing up to this processing is basic calculation processing of convolutional neural networks, and thus will not be specifically described. Further, the subsequent learning method (steps S3 to S7 illustrated in FIG. 17) is the same as that in the first embodiment, and thus will not be described.

As described above, the transmitting apparatus 100b according to the third embodiment includes the matrix conversion processing unit 9 that converts two or more pieces of spread data into a matrix to generate matrix data, and the signal multiplexing and learning unit 10 that multiplexes the matrix data using the convolutional neural network to generate a multiplex signal. Thus, the transmitting apparatus 100b can generate a multiplex signal made to hold information also in the time axis direction including the preceding and following symbols, and the multiplex signal achieves high-performance signal characteristics taking into consideration influence between the preceding and following symbols.

Although the present embodiment has described the transmitting apparatus 100b obtained by adding the matrix conversion processing unit 9 to the transmitting apparatus 100 according to the first embodiment, and replacing the signal multiplexing and learning unit 2 with the signal multiplexing and learning unit 10 constituted by the convolutional neural network, the matrix conversion processing unit 9 may be added to the transmitting apparatus 100a according to the second embodiment, and the signal multiplexing and learning unit 2 may be replaced with the signal multiplexing and learning unit 10. In this case, the same processing unit as the matrix conversion processing unit 9 is added to the learning apparatus 200 according to the second embodiment to convert spread data into a matrix.

Although each of the above embodiments has described the transmitting apparatus that multiplexes spread data obtained by spreading data to generate and transmit a multiplex signal, objects to be multiplexed are not limited to spread data. Objects to be multiplexed may be unspread data.

The transmitting apparatus according to the present invention has the effect of being able to generate a multiplex signal that takes the analog characteristics into consideration while avoiding an increase in design difficulty.

The configurations described in the above embodiments illustrate an example, and can be combined with another known art, and can be partly omitted or changed without departing from the scope.

What is claimed is:

1. A transmitting apparatus comprising:
    an analog transmitting circuitry to perform analog processing on a multiplex signal represented by $M^N$ signal points obtained from combinations of N, where N is two or more, digital signals each taking M values, where M is two or more, to generate a transmission signal; and
    a signal multiplexing and learning circuitry to multiplex the N digital signals with a neural network whose parameters have been adjusted based on analog characteristics of the analog transmitting circuitry, a distance from a signal point of the multiplex signal received by a receiving apparatus to an ideal signal point, and a difference between a peak of correlation between the multiplex signal received by the receiving apparatus and a replica of the multiplex signal and an ideal value of the correlation peak, to generate the multiplex signal.

2. The transmitting apparatus according to claim 1, comprising
    an input signal processing circuitry to adjust symbol rates of the N digital signals, wherein
    the signal multiplexing and learning circuitry obtains the N digital signals whose symbol rates have been adjusted by the input signal processing circuitry.

3. The transmitting apparatus according to claim 1, comprising
    a learning execution circuitry to update the parameters based on the analog characteristics, the distance, and the difference.

4. The transmitting apparatus according to claim 3, wherein
    the learning execution circuitry updates the parameters so that an error function calculated based on the multiplex signal and the analog characteristics becomes smaller.

5. The transmitting apparatus according to claim 3, comprising:
    an analog characteristic transmitting circuitry to transmit the analog characteristics to a learning apparatus having the same function as the signal multiplexing and learning circuitry and the same function as the learning execution circuitry, and cause the learning apparatus to adjust parameters of a neural network included in the learning apparatus; and
    a learning result setting circuitry to change settings of the parameters of the neural network used by the signal multiplexing and learning circuitry, based on results of the adjustment of the parameters of the neural network included in the learning apparatus.

6. The transmitting apparatus according to claim 1, wherein
    the neural network is a convolutional neural network.

7. The transmitting apparatus according to claim 6, comprising
    a matrix conversion processing circuitry to convert the N digital signals into a matrix for input to the convolutional neural network.

8. A transmission method performed by a transmitting apparatus comprising an analog transmitting circuitry to perform analog processing on a multiplex signal represented by $M^N$ signal points obtained from combinations of N, where N is two or more, digital signals each taking M values, where M is two or more, to generate a transmission signal, the method comprising:
    multiplexing, by a signal multiplexing and learning circuitry, the N digital signals with a neural network whose parameters have been adjusted based on analog characteristics of the analog transmitting circuitry, a distance from a signal point of the multiplex signal received by a receiving apparatus to an ideal signal point, and a difference between a peak of correlation between the multiplex signal received by the receiving apparatus and a replica of the multiplex signal and an ideal value of the correlation peak, generating the multiplex signal; and
    performing, by the analog transmitting circuitry, the analog processing on the multiplex signal generated and transmitting, by the analog transmitting circuitry, a signal obtained.

9. A non-transitory computer-readable storage medium storing a program to control a transmitting apparatus comprising an analog transmitting circuitry to perform analog processing on a multiplex signal represented by $M^N$ signal points obtained from combinations of N, where N is two or more, digital signals each taking M values, where M is two or more, to generate a transmission signal, the program causing the transmitting apparatus to perform multiplexing the N digital signals with a neural network whose parameters have been adjusted based on analog characteristics of the analog transmitting circuitry, a distance from a signal point of the multiplex signal received by a receiving apparatus to an ideal signal point, and a difference between a peak of correlation between the multiplex signal received by the receiving apparatus and a replica of the multiplex signal and an ideal value of the correlation peak, generating the multiplex signal, and performing the analog processing on the multiplex signal generated and transmitting a signal obtained.

\* \* \* \* \*